United States Patent [19]

Fisher

[11] Patent Number: 4,461,188
[45] Date of Patent: Jul. 24, 1984

[54] DUAL CLUTCH MULTIPLE COUNTERSHAFT TRANSMISSION

[75] Inventor: Alan R. Fisher, Dearborn, Mich.

[73] Assignee: Ford Motor Company, Dearborn, Mich.

[21] Appl. No.: 333,848

[22] Filed: Dec. 23, 1981

[51] Int. Cl.³ .................................................. F16H 3/08
[52] U.S. Cl. ......................................... 74/330; 74/331; 74/356
[58] Field of Search ............... 74/329, 330, 331, 337, 74/343, 356, 357, 358, 359, 360, 368, 665 B

[56] References Cited

U.S. PATENT DOCUMENTS

| | | | |
|---|---|---|---|
| 2,386,540 | 10/1943 | Campodonico | 74/330 |
| 2,386,541 | 10/1943 | Campodonico | 74/330 |
| 2,416,154 | 2/1947 | Chilton | 74/331 |
| 2,599,801 | 5/1949 | Youngren et al. | 74/330 |
| 2,612,787 | 10/1952 | Youngren et al. | 74/331 |
| 2,862,398 | 12/1958 | Zeidler et al. | 74/330 |
| 3,046,807 | 7/1962 | Barth et al. | 74/331 |
| 3,589,483 | 6/1971 | Smith | 74/331 |
| 4,000,662 | 1/1977 | Wolfe | 74/331 |
| 4,106,364 | 8/1978 | Zenker et al. | 74/331 |
| 4,116,082 | 9/1978 | Kelbel | 74/331 |

OTHER PUBLICATIONS

SAE Paper No. 810104, "A Fully Automatic Vehicle Transmission Using A Layshaft Type Gear Box", by Harry Webster, Feb. 23-27, 1981.

*Primary Examiner*—Leslie A. Braun
*Assistant Examiner*—Bruce F. Wojciechowski
*Attorney, Agent, or Firm*—Frank G. McKenzie; Donald J. Harrington

[57] ABSTRACT

First and second concentric input shafts are connected to an engine crankshaft through friction clutches, one for each input shaft. Two countershafts carrying forward speed ratio and reverse drive output gears are driven from pinions carried by each of the input shafts. Synchronizer clutches connect the output gears to the respective countershafts. The first forward speed output gear is mounted on its countershaft by way of an overrunning clutch. One forward speed output gear is continuously engaged with the reverse drive output gear and functions as a reverse idler for changing the direction of rotation of the countershaft when reverse drive is selected.

7 Claims, 5 Drawing Figures

DUAL CLUTCH MULTIPLE COUNTERSHAFT TRANSMISSION

BACKGROUND OF THE INVENTION

1. Field of the Invention

This invention relates to the field of automatic power transmissions and in particular to such transmissions having multiple countershafts driven by multiple input shafts that are connected to a power source through multiple friction clutches.

2. Description of the Prior Art

Automatic transmissions usually require a hydraulic torque converter or fluid coupling located between the engine and the gear arrangement. These devices require a continuously pressurized hydraulic system and operate at fairly low efficiency over a great portion of their operating range. A preferred automatic transmission would eliminate the torque converter or hydraulic coupling and require only a small oil pump to pressurize a much smaller capacity hydraulic system for operating the clutches and servos that engage the several speed ratios.

It is necessary that an automatic transmission, particularly one for use in a vehicle wherein the engine and transmission are transversely mounted, have a small package space especially with regard to its overall dimension in the transverse direction. Preferably an automatic transmission would permit several aligned and coaxial input shafts to cooperate telescopically one within the other and in this way reduce the length of the transmission between the drivewheels of the vehicle. The length of the transmission can be minimized further if the number of gear wheels carried by the input shafts and countershafts is minimized for a given number of speed ratios.

Transmissions of the multiple countershaft type frequently have a reverse output gear wheel machined on the outer contour of the synchronizer clutch and a sliding gear reverse idler that is moved axially on a support shaft into engagement with a reverse pinion and the reverse output gear. If the reverse drive torque delivery path could be produced without the need for the additional support shaft and reverse idler, a more compact multiple speed ratio automatic transmission would result.

SUMMARY OF THE INVENTION

The multiple speed ratio automatic transmission according to this invention has a minimal transverse dimension between the drivewheels of a front-wheel drive vehicle because its multiple input shafts are nested one within the other so that the gear pairs that produce the various speed ratios are closely proximate.

The transmission avoids the need for a support shaft and for a single function reverse idler gear that is normally used in transmissions of this type to drive a countershaft in an opposite direction for reverse drive than in the forward drive direction. This advantage is realized because one of the forward drive output gears operates in the reverse drive condition as the reverse idler. Each of the gear ratios is selectively coupled to the respective countershafts by shifting a synchronizer clutch of conventional design. Reverse drive results by driveably connecting the reverse output gear to its countershaft and by disengaging the synchronizer clutch of the forward drive gear that functions as the reverse idler.

The transmission according to this invention, when making gear shift changes automatically rather than by manual control of the vehicle operator, preselects by engagement of the synchronizer clutch the next higher and lower speed ratios than the current speed ratio in which the transmission is operating. In this way, upshifts and downshifts from the current speed ratio are quickly made by disengaging one friction clutch and engaging the other friction clutch while engine power is maintained. The synchronizer clutches need not be moved to make these ratio changes. Normally when gear selection is made solely by disengaging synchronizer clutches, engine torque must be removed from the driveshaft during the period in which the synchronizers are moved.

The transmission according to this invention has the ability to slowly and gently alternate between the first forward speed ratio drive and reverse drive and thus to gently rock the vehicle, for example, if it has lost driving contact with the roadway due to ice or snow, by manually selecting the reverse and first speed ratio. When this is done the control system automatically engages the synchronizers that produce the first speed ratio and reverse drive. By alternately disengaging and engaging the friction clutches, the transmission can shift between reverse and forward drive while engine power is maintained.

The transverse dimension of the transmission can be minimized further through the use of an overrunning clutch on one of the forward speed output gears, preferably the first forward speed gear. In this way the synchronizer clutch normally used to connect that output gear to the countershaft can be eliminated. The clutch overruns for any of the other speed ratios for which the associated countershaft would be drive.

In realizing these and other objectives the multiple speed ratio automatic transmission includes first and second input shafts that can be clutched selectively to a source of power. First and second countershafts, which carry multiple forward drive output gears engaged in pairs with pinions formed on the input shafts, also carry synchronizer clutches that can be moved in conventional fashion to driveably connect the output gears to their respective countershafts. A reverse output gear carried by one of the countershafts is continuously engaged with a forward drive output gear carried by the other countershaft. Friction clutches may be alternately engaged to driveably connect one input shaft to the power source and to disengage the other input shaft from the power source.

DESCRIPTION OF THE PREFERRED EMBODIMENTS

Figure 1:
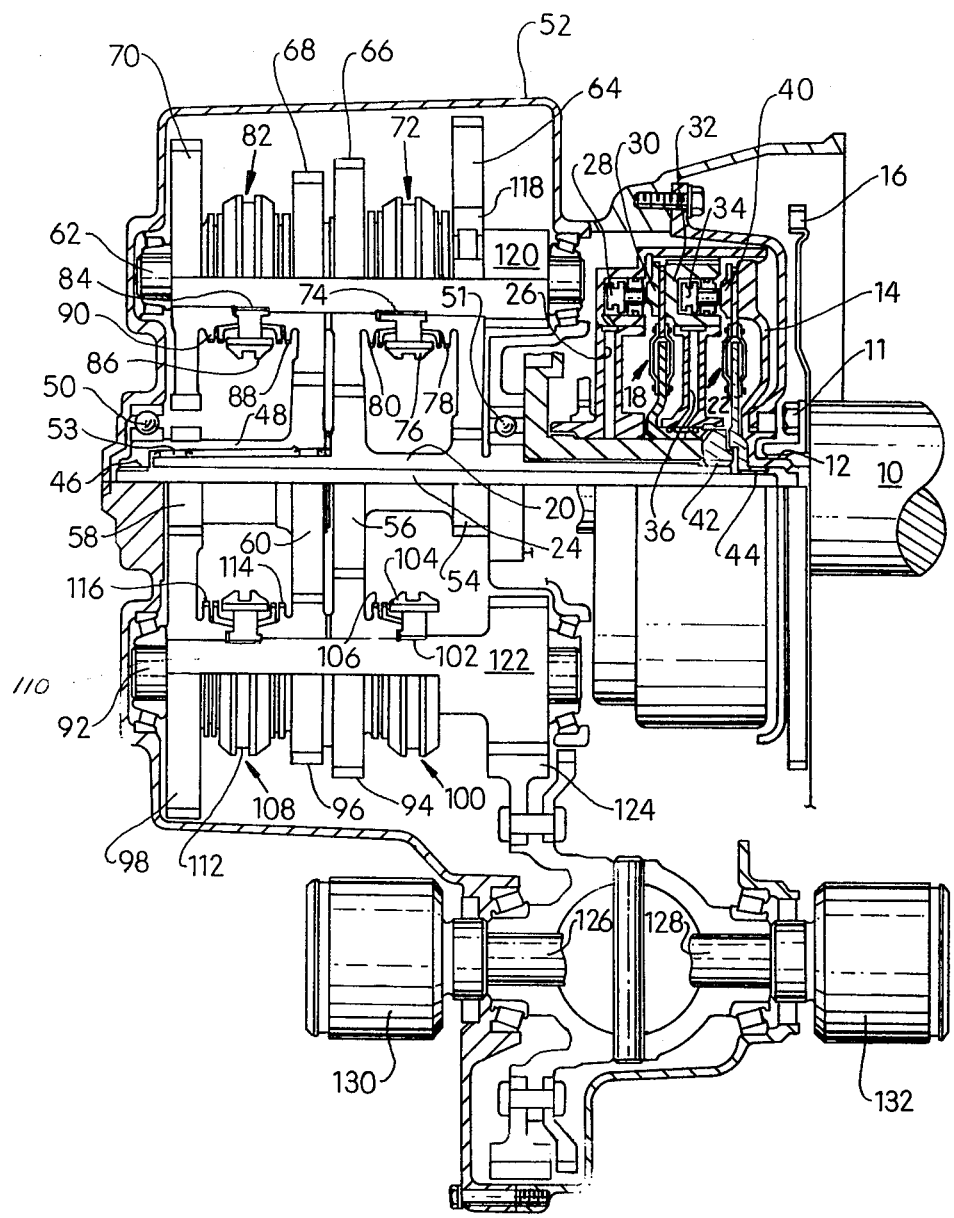
FIG. 1 is a cross section taken along the plane that passes through the axis of the input shafts, the countershafts and the driveshafts of a transmission made according to this invention.
Figure 2:
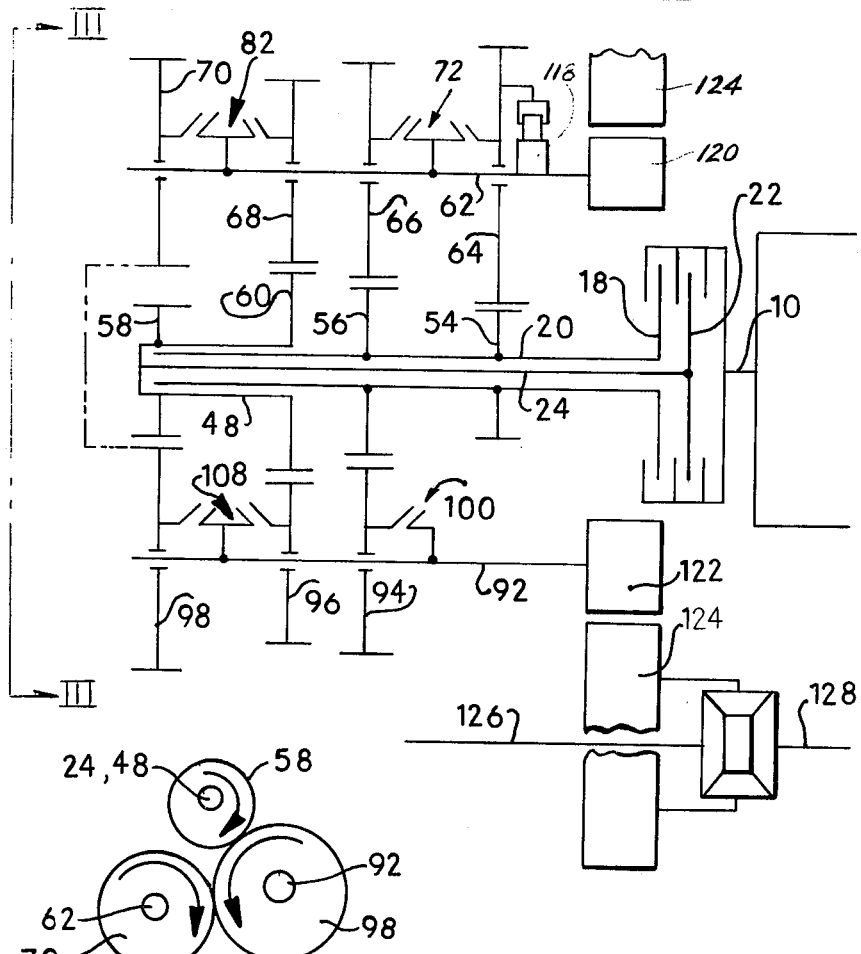
FIG. 2 is a schematic diagram of the gear arrangement of the transmission of FIG. 1.

Referring first to FIGS. 1 and 2, the crankshaft 10 of an engine or other power source is connected through a mechanical attachment 11 and a spline 12 to a clutch housing 14, which is supported on bearings for rotation about the axis of the crankshaft. The bolt 11 joins a starter ring gear 16 to the crankshaft. Within the clutch housing are located a first clutch 18 adapted to driveably connect a first input shaft 20 to the power source and a second clutch 22 adapted to driveably connect a second input shaft 24 to the power source. Pressurized hydraulic fluid is supplied via duct 26 to the cylinder of the first clutch behind piston 28, which moves within the cylinder and applied force to pressure plate 30. The disk of clutch 18 is frictionally engaged between a backing plate 32 and pressure plate 30. Backing plate 32 defines a cylinder for the second clutch 22, within which a second piston 34 is moved when pressurized hydraulic fluid is supplied to the cylinder through duct 36. This action causes a second pressure plate 40 to be forced into frictional engagement with the clutch disc of the second clutch, the pressure force being reacted by a surface formed on the interior surface of clutch housing 14.

The disc of the first clutch 18 is splined at 42 to the end of input shaft 20 and the disc of the second clutch 22 is splined at 44 to the end of second input shaft 24. Input shaft 20 is a sleeve shaft through which shaft 24 extends to the opposite axial extremity where it is connected by a spline 46 to an extension member 48. Support for the shafts is provided by ball bearings 50, 51 retained in recesses formed in the transmission casing 52 and by needle bearings 53.

First input shaft 20 has a first forward speed ratio pinion 54 and a third - fifth forward speed ratio pinion 56 formed integrally with the shaft. Second input shaft 24, whose extension member 48 is journalled on the outer surface of shaft 20, has a second forward speed ratio pinion 58 and a fourth - sixth forward speed ratio pinion 60 formed integrally with member 48.

A first countershaft 62, disposed parallel to the crankshaft and the input shafts, has a first forward speed ratio output gear 64, a third ratio output gear 66, a fourth forward speed ratio gear 68 and a reverse drive output gear 70 journalled on its surface. Countershaft 62 also carries a 1—3 synchronizer clutch 72, which is splined at 74 to shaft 62, and has an axially slideable sleeve 76, which can be moved to engage dogteeth 78 and 80 formed integrally with gears 64 and 66, respectively. Similarly, a 4-R synchronizer clutch 82 is splined at 84 to shaft 62 and carries an axially slideable sleeve 86, which can be moved into engagement with dogteeth 88, 90 formed integrally with gears 68 and 70, respectively. In a conventional way gears 64, 66, 68 and 70 are selectively driveably connected to countershaft 62 upon engagement of clutch sleeves 76 and 86 with the dogteeth of the selected gear.

A second countershaft 92 mounted parallel to countershaft 62 carries a fifth forward speed ratio output gear 94, a sixth forward speed ratio output gear 96 and a second forward speed ratio output gear journalled on its outer surface. Countershaft 92 also carries a fifth ratio synchronizer clutch 100, which is splined to the shaft at 102 and has a sleeve 104 that can be shifted axially to engage dogteeth 106 formed integrally with the fifth speed gear 94. A 2-6 synchronizer clutch 108 is carried on and joined to countershaft 92 at a spline 110. Clutch 108 carries a sleeve 112 that can be shifted axially to engage dogteeth 114, 116 formed respectively on gears 96 and 98. In this way the gears journalled on countershaft 92 can be driveably connected to the shaft upon engagement of sleeves 104, 112 with the dogteeth of the gears.

First speed output gear 64 is permanently connected to countershaft 62 by way of an overrunning clutch 118 that permits a one-way driving connection between gear 64 and shaft 62. When countershaft 62 is driven at a greater speed than the speed of 64 as determined by its engagement with input pinion 54, clutch 118 overruns and the speed of countershaft 62 is determined by the higher speed ratio drive. When shaft 62 is driven in the reverse direction, clutch 18 is disengaged and gear 64 is not driven by the engine; therefore shaft 62 will drive gear 64 without opposition from engine torque.

The pinions integrally formed with input shaft 20 and with the extension member 48 of the second input shaft 24 are continuously engaged with the gears journalled on the first and second countershafts to form gear pairs. For example, pinion 54 is in continuous meshing engagement with gear 64, pinion 56 with gears 66 and 94, pinion 60 with gears 68 and 96, and pinion 58 with gear 98.

Formed integrally with countershaft 62 is an output gear 120 and formed integrally with countershaft 92 is an output gear 122. Output gears 120 and 122 are held in continuous meshing engagement with the differential input gear 124 which is arranged to transmit power to driveshafts 126, 128. The driveshafts transmit power to the drivewheels of the vehicle through universal joints 130, 132, which are constant velocity universal joints of the type required to accommodate the steering and suspension system motions associated with the front drive wheels.

The first forward speed ratio is produced when clutch 18 is engaged, clutch 22 is disengaged, synchronizer clutch 100 is in its neutral position, synchronizer clutch 72 is moved rightward to the first speed ratio position, and synchronizer clutches 82 and 108 are moved leftward to preselect the reverse and second speed ratios, respectively. With the transmission disposed in this way, crankshaft 10 is clutched to the first input shaft 20, pinion 54 drives gear 64, countershaft 62 is driven through the overrunning clutch 118 and output gear 120 drives the differential ring gear 124. The speed ratio change to the second gear ratio results after friction clutch 18 is disengaged and clutch 22 is engaged. Thereafter, synchronizer 72 is shifted to the left thereby preselecting the third speed ratio, synchronizer clutches 82 and 100 are maintained at their neutral positions and synchronizer clutch 108 is kept at its leftward position. The torque path for the second speed ratio therefore includes clutch 22, the second input shaft 24, pinion 58, output gear 98, synchronizer clutch 108, countershaft 92, output gear 122 and the differential input gear 124.

An upshift to the third speed ratio is produced when friction clutch 22 is disengaged and clutch 18 is engaged. Synchronizer clutch 82 is shifted to the right in order to preselect the fourth output gear, clutches 100 and 108 are in their neutral positions and clutch 72 is at its leftward position. The torque delivery path for the third speed ratio includes input shaft 20, pinion 56, output gear 66, synchronizer clutch 72, countershaft 62, output gear 120 and the differential input gear 124.

An upshift to the fourth speed ratio requires that friction clutch 18 be disengaged and clutch 22 be engaged. Synchronizer clutch 72 is moved to its neutral position, synchronizer clutch 100 is shifted to the left to preselect the fifth speed ratio, synchronizer clutch 108 is kept at its neutral position and clutch 82 is kept at its rightward position. The torque delivery path for the fourth speed ratio includes input shaft 24, extension shaft 48, pinion 60, output gear 68, synchronizer clutch 82, countershaft 62, output gear 120, and the differential input gear 124.

An upshift to the fifth forward speed ratio requires that friction clutch 22 be disengaged and clutch 18 be engaged. Synchronizer clutch 100 be kept at its leftward position thereby driveably connecting output gear 94 to countershaft 92. The sixth speed ratio is preselected by moving synchronizer clutch 108 to the right. Synchronizer clutches 72 and 82 are located at their neutral positions. The first input shaft 20 drives the second countershaft 92 through pinion 56, output gear 94 and synchronizer clutch 100.

An upshift to the sixth forward speed ratio is produced when friction clutch 18 is disengaged and clutch 22 is engaged. Synchronizer clutch 108 is positioned to the right thereby connecting output gear 96 to countershaft 92. Synchronizer clutch 100 remains in its leftward position so that the fifth forward speed ratio is preselected. Synchronizer clutches 72 and 82 are maintained at their neutral positions. In this way, the second input shaft 24 drives the second countershaft 92 through input pinion 60, output gear 96 and synchronizer clutch 108.

A downshift to the fifth speed ratio results by disengaging friction clutch 22 and engaging clutch 18. Then synchronizer clutch 82 is moved to the right to preselect the fourth speed ratio. Synchronizers 72 and 108 are in their neutral positions and synchronizer 100 is kept at its leftward position.

Similarly, each downshift is made by alternating the engagement and disengagement of clutches 18 and 22. The synchronizer for the selected gear ratio is kept in its preselected position, the synchronizer for the next lower speed ratio is shifted to preselect that ratio and the other two synchronizers are in their neutral positions.

The transmission is disposed for reverse drive by moving synchronizer clutches 100 and 108 to their neutral positions, clutch 82 leftward, whereby the reverse output gear 70 is connected to countershaft 62, and synchronizer clutch 72 rightward, thereby preselecting the first output gear 64. When the first forward ratio is manually selected, the drive components are positioned as they are when reverse drive is manually selected. Friction clutch 18 is disengaged and clutch 22 is engaged for reverse drive, but clutches 18 and 22 are oppositely engaged and disengaged to produce the first speed ratio. In this way, crankshaft 10 is clutched to the second input shaft 24, which drives the first countershaft 62 through input pinion 58, the second speed output gear 98, which functions as a reverse idler, reverse output gear 70 and synchronizer clutch 82. The vehicle can be gently rocked forward and backward by manually selecting either the first forward ratio or the reverse drive and then alternately engaging and disengaging the first and second clutches 18 and 22. By simply engaging clutch 18 and disengaging clutch 22 and then engaging clutch 22 and disengaging clutch 18 the transmission will shift between the first forward speed and reverse drive.

Figure 3:
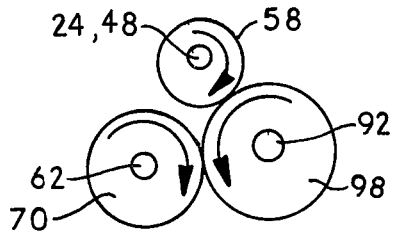
FIG. 3 is a view taken in direction III—III of FIG. 2.

The transmission according to this invention produces reverse drive without the need for a separate reverse idler to reverse the direction of motion between the input shaft and the countershaft. This advantage is realized, as best illustrated with reference to FIG. 3, because the forward drive output gear of one forward speed ratio, in this case the second ratio, is continuously engaged with its associated drive pinion and with the reverse output gear. From the direction of the arrows in FIG. 3 representing the direction of motion of the gears it can be seen that the reverse gear 70 turns in the opposite direction from that of the countershaft 92 and the second ratio output gear 98. Gear 70 is driven from the second ratio output gear 98 provided synchronizer 108 is disengaged from gear 98 and synchronizer 82 is engaged with gear 70. Output gear 98 functions as a reverse idler transmitting torque from pinion 58 to the reverse output gear 70. Preferably gears 98 and 70 are of the same size.

Figures 4, 5:
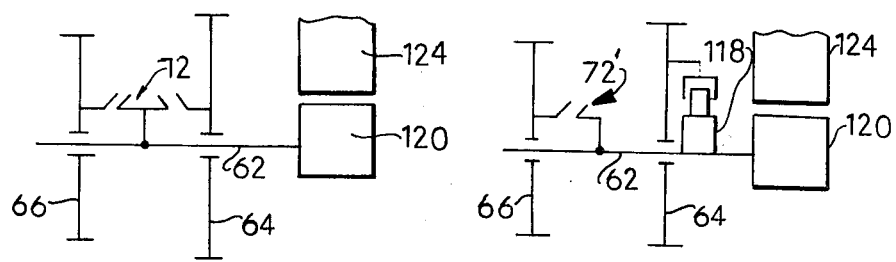
FIG. 4 is a partial schematic diagram, similar to that of FIG. 2, of a portion of the countershaft that carries the first and third output gears showing the first output gear connected to the countershaft only by a synchronizer clutch.
FIG. 5 is a schematic diagram showing a portion of the countershaft in the region of the first forward speed output gear showing the gear connected to the shaft only through an overrunning clutch.

FIG. 4 illustrates another embodiment of this invention wherein the overrunning clutch that connects the first forward speed output gear 64 to its countershaft 62 is deleted. In this arrangement the first forward speed ratio is produced when synchronizer clutch 72 is moved rightward, friction clutch 18 is engaged and clutch 22 is disengaged.

Alternatively, the first forward speed ratio can be produced with the transmission of this invention without the use of a first forward speed synchronizer clutch such as 72. This embodiment is illustrated in FIG. 5 wherein the first forward speed ratio is produced through operation of overrunning clutch 118, which driveably connects output gear 64 to countershaft 62. The third and fourth forward speed ratios cause countershaft 62 to turn faster than output gear 64, hence clutch 118 overruns and the higher speed ratios are not influenced by the continuous engagement of the overrunning clutch. In reverse drive friction clutch 18 is disengaged and gear 64 is not driven by the engine. Therefore, shaft 62 will drive gear 64 without opposition from engine torque.

The term synchronizer clutch means any shifter for driveably connecting a gear to a shaft by shifting motion to engage dog teeth regardless of whether the shaft and gear motions are synchronized. For example, the shift sleeves of the synchronizer clutches might engage the dog teeth formed on the gear without resort to engagement of the dog teeth on the synchronizer cones or the use of synchronizer cones or any other means for synchronizing the speeds.

Having described a preferred embodiment of my invention what I claim and desire to secure by U.S. Letters Patent is:

1. A multiple speed ratio transmission comprising:
   first and second input shafts adapted to be clutched to a power source;
   first and second countershafts driven selectively from the first and second input shafts;
   gearing defining multiple forward drive torque paths that include multiple pairs of meshing gears, one gear of each pair carried by the first or second input shafts, the other gear of each pair carried by the first or second countershafts, the gearing further defining a reverse drive torque path that includes one of the forward drive gear pairs and a reverse drive output gear meshing with one of the gears of said forward drive gear pair, each of the gears of the reverse drive torque path transmitting torque to each gear with which it meshes;

synchronizer clutch means for selectively driveably connecting at least one gear of each forward drive torque path to its associated shaft and for connecting two gears of the reverse drive torque path to their associated shafts; and means for alternately driveably connecting the first input shaft to the power source and disconnecting the second input shaft from the power source and for driveably connecting the second input shaft to the power source and disconnecting the first input shaft from the power source.

2. The transmission of claim 1 wherein one gear of each gear pair that forms a forward speed ratio torque path is carried by a different input shaft than the input shaft that carries the corresponding gear of the next higher or lower forward speed ratio torque path.

3. The transmission of claim 1 wherein one gear of each gear pair that forms a forward speed ratio torque path is driveably connected to the power source by a different clutch than the clutch that connects the corresponding gear of the next higher or lower forward speed ratio torque path to the power source.

4. The transmission of claim 1 wherein the first ratio forward drive output gear is driveably connected to its associated shaft by an overrunning clutch for establishing a one-way driving connection between said gear and said shaft.

5. A multiple speed ratio transmission comprising:

a first input shaft adapted to be clutched selectively to a power source, the shaft carrying multiple pinions of alternate forward speed ratio torque paths;

a second input shaft adapted to be clutched selectively to a power source, the shaft carrying multiple pinions of alternate forward speed ratio torque paths different from those of the first input shaft;

a first countershaft carrying multiple forward drive output gears engaged in pairs with the pinions of the first and second input shafts to form multiple forward drive torque paths;

a second countershaft carrying multiple forward drive output gears engaged in pairs from the pinions of the first and second input shafts to form multiple forward drive torque paths of speed ratios different from the speed ratios of the first countershaft;

a reverse output gear carried by a countershaft and engaged with the gear of a forward speed ratio torque path pair to form a reverse drive torque path comprising the reverse output gear and said forward speed ratio torque path pair, each gear and pinion of said reverse torque path transmitting torque to each gear or pinion with which it is engaged;

synchronizer clutch means for selectively driveably connecting the output gears to their associated shafts; and means for alternately driveably connecting the first input shaft to the power source and disconnecting the second input shaft from the power source and for driveably connecting the second input shaft to the power source and disconnecting the first input shaft from the power source.

6. The transmission of claim 5 wherein a forward drive output gear is driveably connected to its associated shaft by an overrunning clutch for establishing a one-way driving connecting between said gear and said shaft.

7. The transmission of claim 5 wherein a forward drive output gear has no synchronizer clutch for driveably connecting said gear to its associated shaft and wherein said gear is driveably connected to said shaft by an overrunning clutch for establishing a one-way driving connection between said gear and said shaft.

* * * * *